4 Sheets—Sheet 1.

E. TOWNSEND, Decd.

The Shoe Machinery Manufacturing Company, Assignee of HENRY E. TOWNSEND, Administrator.

SEWING-MACHINE.

No. 7,384. Reissued Nov. 7, 1876.

Witnesses.

L. H. Latimer.
W. J. Pratt.

Inventor

The Shoe Machinery Manufacturing Company.
Assee of Elmer Townsend
per Crosby & Gregory Attys 4 Sheets—Sheet 2.
E. TOWNSEND, Decd.
The Shoe Machinery Manufacturing Company, Assignee of HENRY E. TOWNSEND, Administrator
SEWING-MACHINE.
No. 7,384. Reissued Nov. 7, 1876.
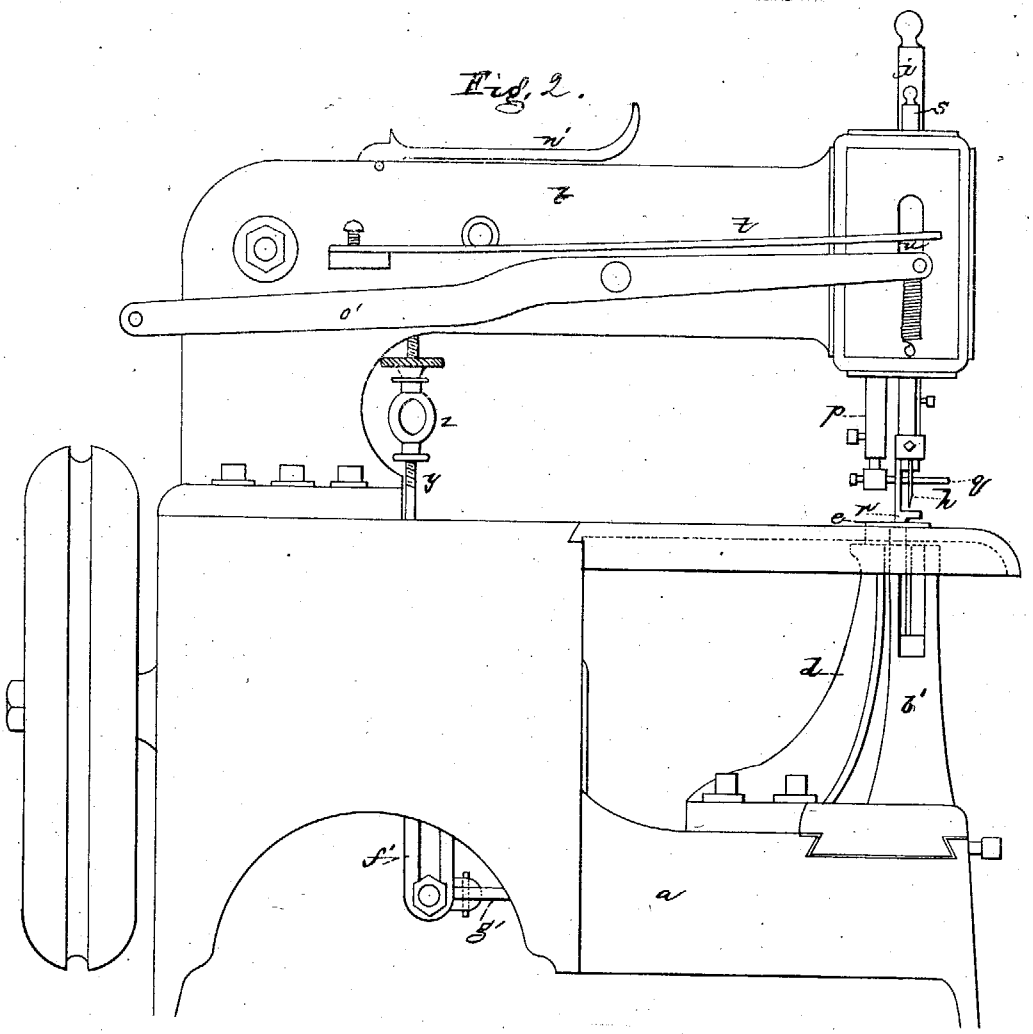
Witnesses.
L. H. Latimer.
W. J. Pratt.
Inventor.
The Shoe Machinery Manufacturing Company.
Assee of Elmer Townsend
per Crosby Gregory
Atty's.

4 Sheets—Sheet 3.

E. TOWNSEND, Decd.

The Shoe Machinery Manufacturing Company, Assignee of HENRY E. TOWNSEND, Administrator.

SEWING-MACHINE.

No. 7,384. Reissued Nov. 7, 1876.

Witnesses.

E. H. Latimer.

W. J. Pratt.

Inventor

The Shoe Machinery Manufacturing Company
Assee of Elmer Townsend
per Crosby & Gregory Attys.

4 Sheets—Sheet 4.

E. TOWNSEND, Decd.

The Shoe Machinery Manufacturing Company, Assignee of HENRY E. TOWNSEND, Administrator.

SEWING-MACHINE.

No. 7,384. Reissued Nov. 7, 1876.

Witnesses.
S. H. Gratacap.
W. J. Pratt.

Inventor.
The Shoe Machinery Manufacturing Company.
Assee of Elmer Townsend
per Crosby & Gregory, Attys.

UNITED STATES PATENT OFFICE

THE SHOE MACHINERY MANUFACTURING COMPANY, OF BOSTON, MASSACHUSETTS, ASSIGNEE OF HENRY E. TOWNSEND, ADMINISTRATOR OF ELMER TOWNSEND, DECEASED.

IMPROVEMENT IN SEWING-MACHINES.

Specification forming part of Letters Patent No. 34,915, dated April 8, 1862; reissue No. 7,384, dated November 7, 1876; application filed September 15, 1876.

*To all whom it may concern:*

Figure 1:
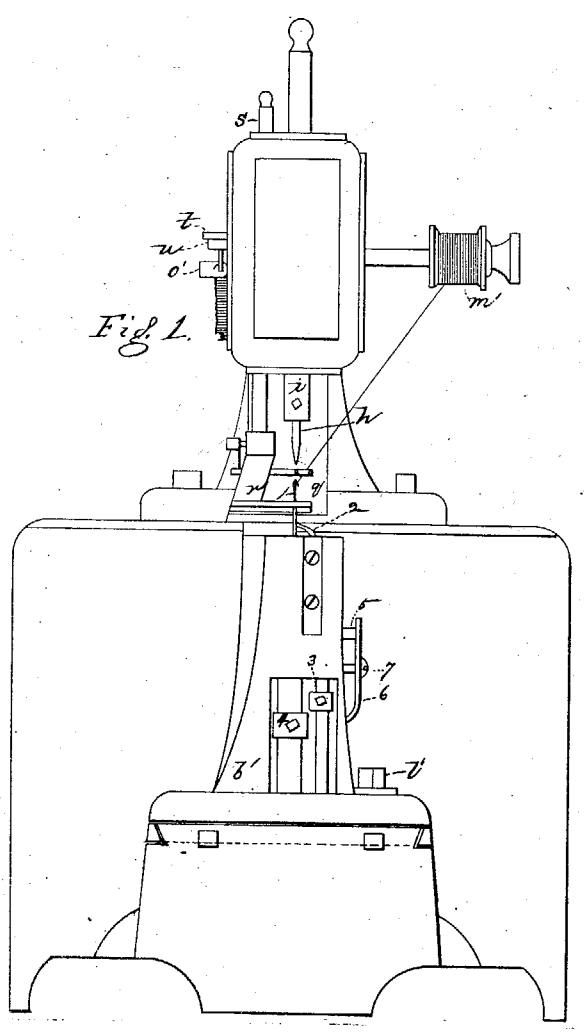
Figure 5:
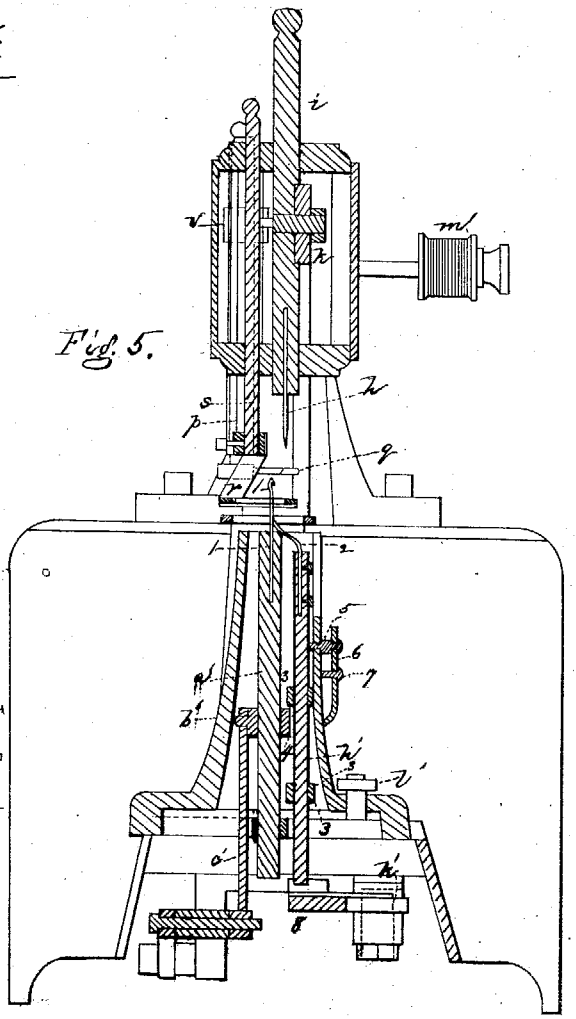
Figure 3:
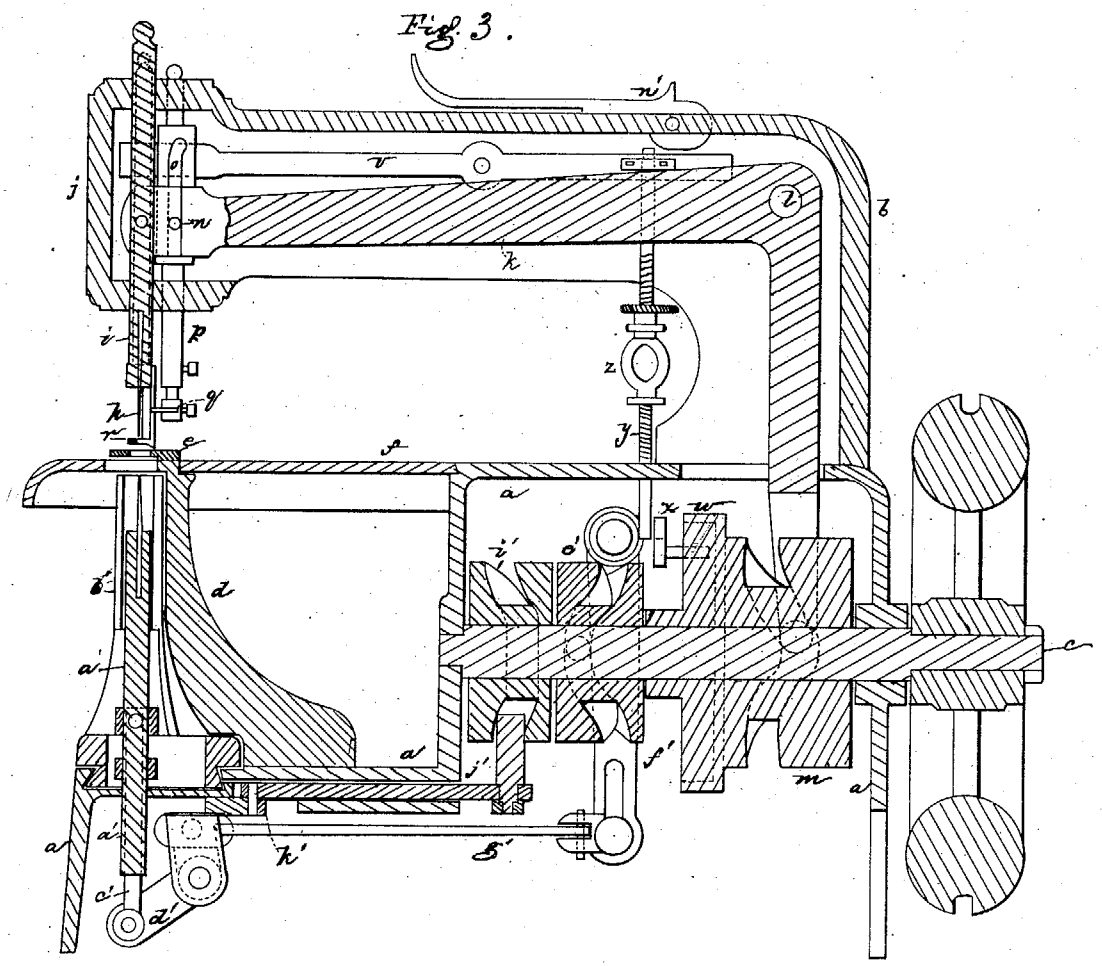
Figure 7:
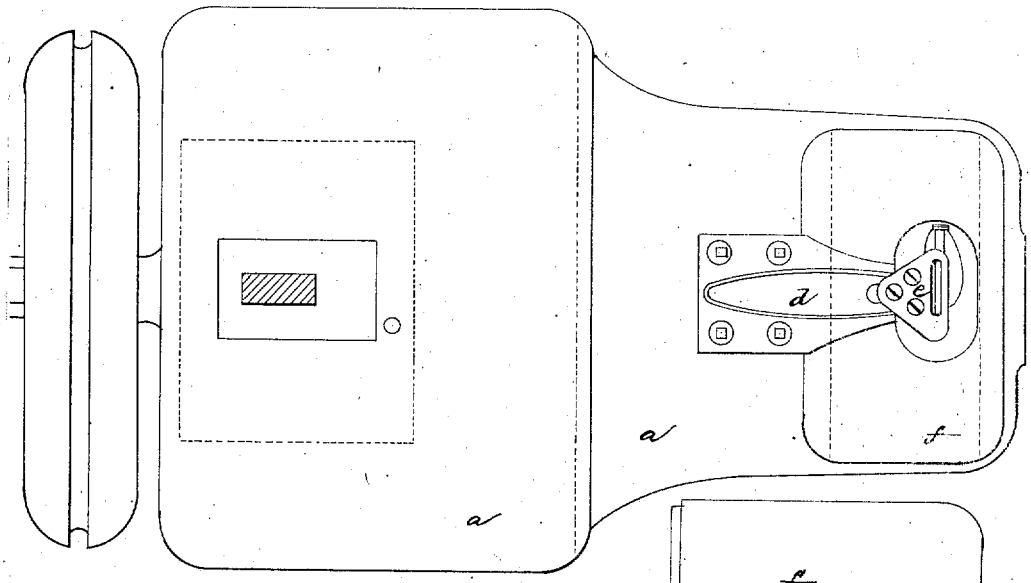
Figure 6:
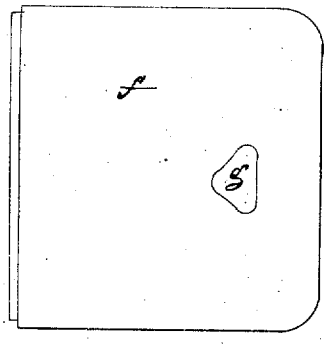
Figure 4:
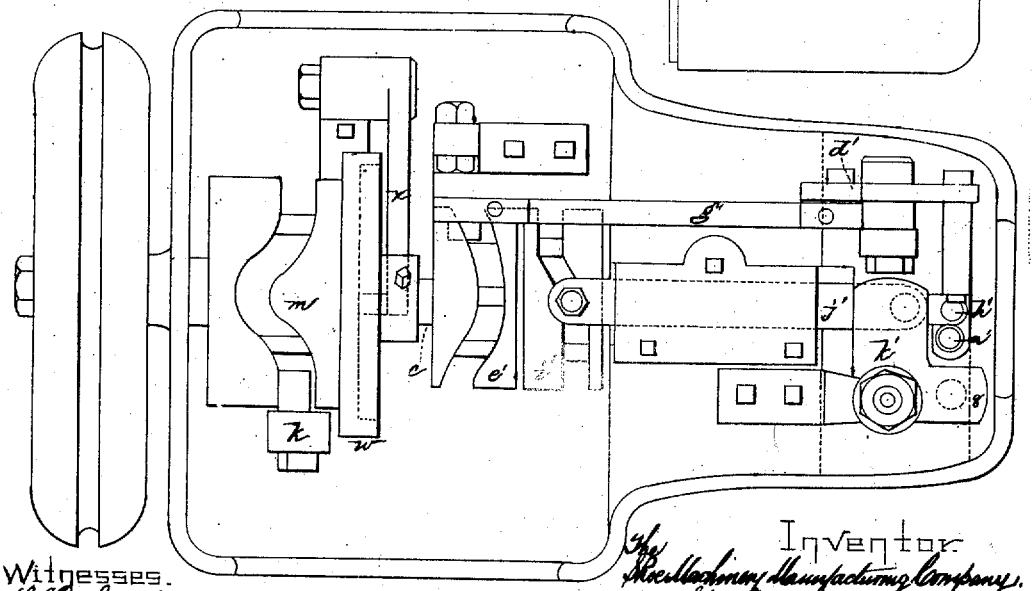

Be it known that ELMER TOWNSEND, late of Boston, in the county of Suffolk and State of Massachusetts, invented certain new and useful Improvements in Sewing-Machines, of which the following description, taken in connection with the accompanying drawings, is a specification:

Figure 1 is a front elevation, Fig. 2 a side elevation, Fig. 3 a longitudinal section, Fig. 4 an under side view, and Fig. 5 a transverse section, of a sewing-machine constructed in accordance with this invention.

This invention has more especial reference to sewing-machines for sewing leather.

In this machine a reciprocating awl, operating from above, perforates the leather, held down by a presser for the passage of a hooked needle from below, up through the hole in the leather, where the needle (it being provided with the usual cast-off) is supplied with thread by a thread-carrier. The hooked needle, in addition to its regular sewing movement, has a feeding movement imparted to it through a movable carriage, in which the needle-bar and cast-off are reciprocated, the feeding movement of the needle taking place when the presser is lifted from the work.

The invention has reference to the combination of an awl for puncturing the material, and a lifting-presser and a thread-guide above the table, with a hooked needle and cast-off below the table, the hooked needle with its cast-off being adapted to form the stitch and to feed the material for each new stitch.

In the drawing, *a* represents the frame of the machine, *b* the overhanging arm, and *c* the main or driving shaft. The small post-like work-support *d*, provided with a removable needle hole or throat-plate, *e*, is adapted to be placed within the article to be sewed, or the article may be so placed upon it as to extend down either wholly or partially around it. The awl *h* is carried by an awl-bar, *i*, guided in the head *j*, and it is reciprocated through the action of a vibrating arm or lever, *k*, pivoted at *l*, and moved by a cam-grooved hub, *m*, on shaft *c*. A pin, *n*, on lever *k*, enters a slot, *o*, in a hub on the shaft *p*, provided at its lower end with a thread-carrier, *q*, and the movement of the pin turns the thread-carrier shaft, and causes it to vibrate toward and away from the hooked needle, to supply it with thread for the formation of the seam. The presser-foot *r* has a socket at top, and is fitted to the lower end of the presser-bar *s* by a set-screw. The presser is held down positively against the work at all times, except when the needle is performing its feeding movement, by means of strong spring *t*, that rests at one end upon a projection, *u*, of the presser-bar.

When the needle is actuated to move the material for a new stitch, the presser is lifted positively above the material, thereby relieving it from pressure, to prevent abrading the surface of the leather by friction between the presser and support. The presser is lifted by a lever, *v*, operated by a grooved cam, *w*, on shaft *c*, through a lever, *x*, and an adjustable connecting-link, *y*, the latter having a nut, *z*, to shorten or lengthen the link to adapt the foot to the thickness of the leather.

The needle-bar *a'*, provided with a hooked needle, 1, is reciprocated in suitable bearings of a post-like needle-carrying head, *b'*, adapted by its movement to impart the feeding movement to the hooked needle while the latter is yet in the material and the presser is lifted. The needle-bar is connected by link *c'* with an elbow-lever, *d'*, operated by a cam, *e'*, through a radius-bar, *f'*, and a link, *g'*, connecting the radius-bar and elbow-lever. The cast-off bar *h'*, provided with a cast-off, 2, is supported in bearings in the head *b'*, is provided with lugs 3 3, and is operated by the lug 4 on the needle-bar as the latter rises and falls, the cast-off bar being held against movement (except through the lug 4) by means of a friction device, 5, shown as attached to a spring, 6, adjustable by means of a screw, 7.

In Fig. 5 of the drawings the hooked needle is shown as having completed its feeding movement, and as having started to descend, the presser also moving down. The upper portion of the cast-off fits closely about the side of the needle, and its extreme point, when the cast-off is in its highest position, terminates a little above the level of the throat-plate, just far enough above such level to touch or enter the under side of the material being sewed. By lifting the cast-off point to this height the old loop on the shank of the needle, and to be cast off over the hook at the next descent of the needle, is held at its doubled or central part by the cast-off point, and is prevented from being drawn closely about the needle-shank alone, and, consequently, when the hooked needle descends, the cast-off point, already within the double of the loop, and holding it against the under side of the material, easily casts the loop over the hook, then supplied with a new loop.

As the needle-bar and needle move from the position shown in Fig. 5 downward, the lug 4 leaves the upper lug 3 of the cast-off bar, and the cast-off and its bar remain stationary, the cast-off holding the old loop yet on the needle-shank open, so that the hook of the needle does not engage it as the hook passes out of the material.

As the hook emerges from the under side of the material and into the bight of the old loop on its shank, the lug 4 meets the lower lug 3, and then the needle and cast-off descend together, the cast-off closing the front side of, and retaining the new loop in, the needle-hook. When the needle-bar rises to enter the hole made by the awl working from the opposite side of the material, the lug 4 leaves the lower lug 3, the cast-off remains down, and it is not raised until the lug 4 meets the upper lug 3, and then the needle and cast-off move together until the cast-off meets the under side of the material, the needle being then at its highest point. The needle, in rising, enters the hole in the material made by the awl, and while the awl is yet in the material. The needle and awl rise substantially together, their points being but little separated, and the awl keeps open for the passage of the needle, the hole in the material then being subjected to the action of the presser-foot, and then held pressed down upon the throat-plate. When the cast-off begins to rise, it meets the loop of thread just drawn down by the hook of the needle, and made slack or loose on the needle-shank as the needle rises to enter the material. The cast-off in its movement passes into this loop, or between its doubled part and the side of the needle, this being done before the thread-guide draws this last loop taut. As the needle reaches its highest position, the presser is lifted, relieving the material from pressure, and then the needle has imparted to it its feeding movement, and at the termination of the feeding movement the presser is thrown down, and the needle descends. After the needle reaches its highest position the awl is further lifted, making a passage for the thread-carrier to present its thread to the hook of the needle. The needle takes the thread during its descent, and after the completion of its feeding movement.

The apparatus for imparting to the needle its feeding movement is shown as a post-like head, $b'$, placed immediately in front of the post-like work-support, and adapted to be moved away from the operator or toward the back of the machine, a portion of the head being fitted to ways, and operated to give the needle its feeding movement through the action of a cam, $i'$, and a slide-link, $j'$, connected with an elbow-lever, $k'$, the arm 8 of the elbow-lever being grooved to receive an adjustable pin, $l'$, attached to the head. By moving this pin toward or away from the fulcrum of the elbow-lever the distance of the feeding movement of the needle, and consequently the length of stitch, is regulated. The thread in the eye of the thread-carrier is supplied to the needle, the carrier being actuated by suitable mechanism.

The presser may be lifted at any time by hand through the hand-lever $n'$, it, when elevated, acting upon and moving lever $v$.

The lever $o'$ is adapted to be connected with a foot-lever, to lift the presser when desired. The head in which the needle and cast-off work is arranged to move directly in front of the post-like support and under the overhanging needle-hole plate, and the needle and cast-off and their bars are readily accessible, which would not be the case if the head were inclosed in a hollow vertical post. The extent of feeding movement of the head is such as not to interfere with the work placed about the post-like support and the head $b'$.

If the duty of feeding the cloth were to be performed by the awl instead of the needle, the conditions under which the feeding would be effected would be quite different from what they are when the feeding is done by the needle in the manner I have described. The awl, when used to feed the material, is caused to penetrate and move the material during the time that the needle in its lowest position holds the loop, thereby straining the loop, and frequently breaking the needle, which is a very serious evil. When the awl is employed to feed the material, the latter is also free from pressure by the presser. When the awl feeds the material, (the needle holding the loop down below it,) it is not so easy to feed the material in a straight line or to turn a sharp corner, for the material is held at two points, viz., at the point where the awl engages it, and at the point where the loop of thread is connected with the material, and the material is apt to be twisted out of its true course, and also with thin material the draw on the loop the awl feeding is apt to ruck up the material between the last stitch or loop made and the awl.

When the needle feeds the material, the latter may be turned to change the course of the seam at any time from the commencement to the completion of the feeding movement, the needle serving as the pivotal center for the material, it being the only point at which the material is held.

When the awl feeds the material, the latter must be turned to change the direction of the seam just at the time when the awl reaches its position immediately over the needle, and consequently the time at which the feed can take place is restricted, requiring more expert operators to run such a machine than are required for the needle-feed machines.

It is not new, broadly, to feed the material by means of a needle.

What is claimed is—

1. An awl to puncture the material, a lifting-presser, and a thread-guide, all arranged above the material and work-support, in combination with a hooked needle and cast-off below the table, and with means to impart to them movements to form the stitch and feed the material, substantially as described.

2. The post-like work-support and its overhanging throat-plate, in combination with a movable head, adapted to carry the hooked needle and cast-off, and impart to the needle its feeding movement to move the material, substantially as described.

THE SHOE MACHINERY MANUF. CO.,
By EDWIN L. BARNEY,
*Its President.*

Witnesses:
SAML. W. BATES,
GEO. W. GREGORY.